United States Patent
Cai et al.

(10) Patent No.: US 12,316,211 B2
(45) Date of Patent: May 27, 2025

(54) SYNCHRONIZED MULTI-INVERTER SYSTEM WITH REDUCED RIPPLE CURRENT IN DC LINK

(71) Applicant: Cummins Inc., Columbus, IN (US)

(72) Inventors: Minyu Cai, Roseville, MN (US); Akm Arafat, Blaine, MN (US); Bradford K. Palmer, Ham Lake, MN (US); Dakshina S. Murthy-Bellur, Plymouth, MN (US)

(73) Assignee: Cummins Inc., Columbus, IN (US)

( * ) Notice: Subject to any disclaimer, the term of this patent is extended or adjusted under 35 U.S.C. 154(b) by 81 days.

(21) Appl. No.: 18/016,178

(22) PCT Filed: Jul. 8, 2021

(86) PCT No.: PCT/US2021/040911
§ 371 (c)(1),
(2) Date: Jan. 13, 2023

(87) PCT Pub. No.: WO2022/015575
PCT Pub. Date: Jan. 20, 2022

(65) Prior Publication Data
US 2023/0253873 A1 Aug. 10, 2023

Related U.S. Application Data

(60) Provisional application No. 63/053,127, filed on Jul. 17, 2020.

(51) Int. Cl.
*H02P 1/00* (2006.01)
*B60L 15/08* (2006.01)
(Continued)

(52) U.S. Cl.
CPC ............... *H02M 1/14* (2013.01); *B60L 15/08* (2013.01); *B60L 53/20* (2019.02); *H02M 7/5395* (2013.01); *H02P 5/74* (2013.01)

(58) Field of Classification Search
CPC ....... H02M 1/14; H02M 7/5395; B60L 15/08; B60L 53/20
(Continued)

(56) References Cited

U.S. PATENT DOCUMENTS

2005/0163237 A1 7/2005 Katanaya
2009/0108798 A1 4/2009 Schulz et al.
(Continued)

OTHER PUBLICATIONS

International Search Report and Written Opinion for International patent application No. PCT/US2021/040911, filed Jul. 8, 2021, mailed Oct. 18, 2021.
(Continued)

*Primary Examiner* — Erick D Glass
(74) *Attorney, Agent, or Firm* — Faegre Drinker Biddle & Reath LLP (57) ABSTRACT

An inverter system is provided such that the system includes a direct-current (DC) voltage supply electrically coupled with a DC link, a plurality of inverters, each electrically coupled with the DC link, a plurality of electric machines where each electric machine is electrically coupled with one of the inverters, and a controller coupled with each of the inverters. The controller can control carrier signals of the inverters such that the carrier signals are synchronized and interleaved at an angle (θ) that is determined based on the waveform type of the carrier signals and the number of inverters in the system.

20 Claims, 9 Drawing Sheets

(51) Int. Cl.
    *B60L 53/20*     (2019.01)
    *H02M 1/14*      (2006.01)
    *H02M 7/5395*    (2006.01)
    *H02P 1/28*      (2006.01)
    *H02P 3/00*      (2006.01)
    *H02P 5/74*      (2006.01)
    *H02P 7/06*      (2006.01)

(58) Field of Classification Search
    USPC .......................................................... 318/504
    See application file for complete search history.

(56) References Cited

U.S. PATENT DOCUMENTS

| | | | |
|---|---|---|---|
| 2010/0072928 A1* | 3/2010 | Welchko | B60L 50/51 |
| | | | 180/65.285 |
| 2011/0074326 A1* | 3/2011 | Su | H02P 27/08 |
| | | | 318/400.27 |
| 2011/0260656 A1 | 10/2011 | Kazama | |
| 2012/0153882 A1 | 6/2012 | Hong | |
| 2014/0361613 A1* | 12/2014 | Huang | H02J 1/06 |
| | | | 307/12 |
| 2016/0118925 A1 | 4/2016 | Kim | |

OTHER PUBLICATIONS

European Search Report for EP Patent Application No. 21842657.5, Issued on Jul. 17, 2024, 10 pages.
International Application No. PCT/US2021/040911, International Preliminary Report on Patentability, mailed Jan. 26, 2023.
Supplementary European Search Report and Written Opinion for European patent application No. 21842657.5, mailed Jul. 17, 2024.

* cited by examiner

SYNCHRONIZED MULTI-INVERTER SYSTEM WITH REDUCED RIPPLE CURRENT IN DC LINK

CROSS-REFERENCE TO RELATED APPLICATIONS

This application claims priority to International Patent Application No. PCT/US2021/040911, filed Jul. 8, 2021, which claims priority to U.S. Provisional Application No. 63/053,127, filed on Jul. 17, 2020, both of which are incorporated herein by reference in their entirety.

FIELD OF THE DISCLOSURE

The present disclosure generally relates to inverters, more specifically to circuit systems with multiple inverters that convert electrical energy between a power source and multiple motor-generators.

BACKGROUND OF THE DISCLOSURE

Figure 1:
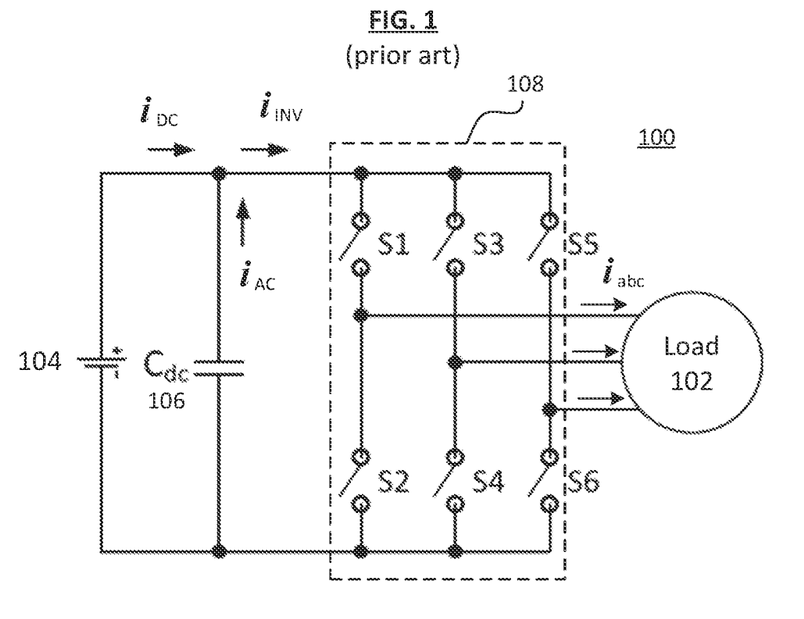
FIG. 1 is a schematic diagram of an inverter system as known in the art.
Figure 2:
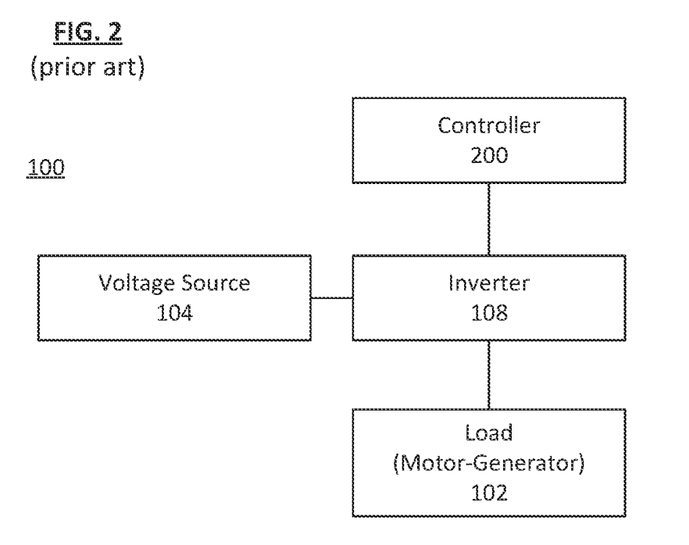
FIG. 2 is a block diagram of an inverter system with a controller as known in the art.

An inverter converts electrical energy between direct current (DC) and alternating current (AC). In an electric system, the inverter can connect to an electric machine such as a motor-generator (MG) or any other three-phase load or source. Shown in FIGS. 1 and 2 are the electric system 100 where a load 102 is connected to a DC voltage source 104 and a capacitor 106 through an inverter 108. The inverter 108 includes six power switches (S1 through S6) to form a three-phase inverter where the control signal for each power switch is generated by a controller 200. Three types of current pass through the system, one being a DC current $i_{DC}$ passing through the DC voltage source 104, the other being $i_{AC}$ passing through the capacitor 106, and lastly the inverter current $i_{INV}$ which is the sum of the other two currents $i_{DC}$ and $i_{AC}$. The inverter output currents $i_a$, $i_b$, $i_c$ (shown collectively as $i_{abc}$ in FIG. 1) are the currents passing through the load 102 when the appropriate switches are activated. The AC portion of the inverter current, $i_{AC}$, is referred to as ripple current.

Figure 3:
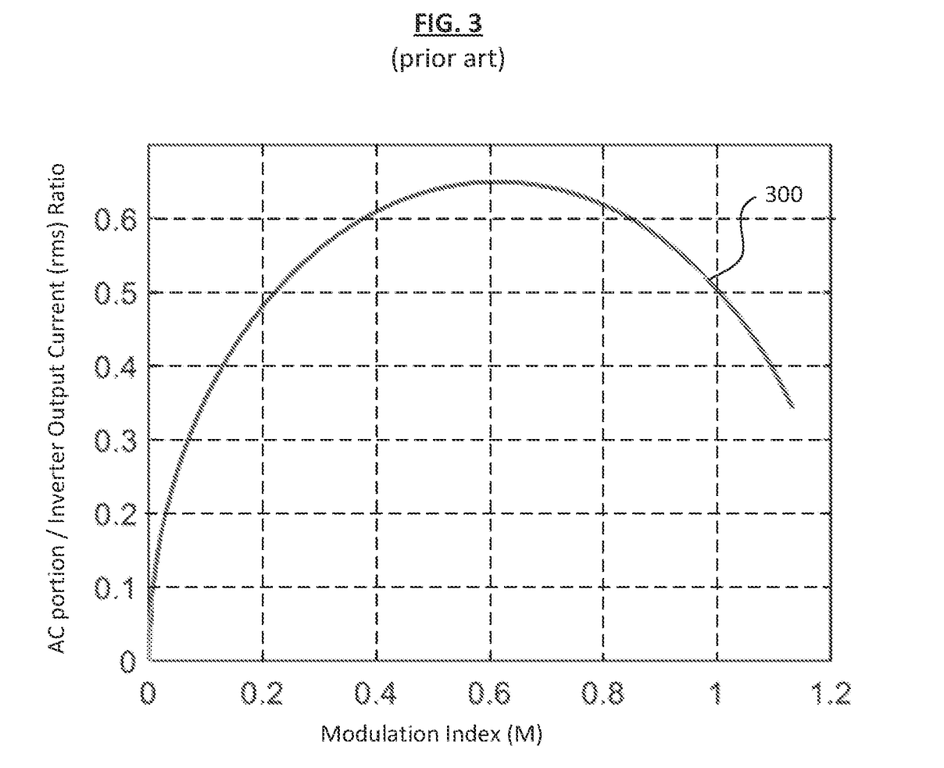
FIG. 3 is graph illustrating the changes in the ratio of AC portion of the inverter current to the inverter output current for different modulation indices.

In capacitors, power loss and internal heating are dependent on the current passing through it. In this case, it is the ripple current that passes through the capacitor. Where there is more ripple current, the capacitor degradation is greater because of the rising internal temperature. In some examples, as shown in the ratio curve 300 of FIG. 3, the root mean square (rms) value for the AC portion $i_{AC}$ can be as high as 65% of the rms value of the inverter output current $i_{abc}$ depending on the modulation index (M) of the control signal when a three-phase pulse width modulation (PWM) is used. When there are multiple inverters sharing a common DC-link capacitor, the ripple current generated by all inverters can add up to an even higher value. As such, there is a need to reduce the ripple current to improve the power loss and internal heating of the capacitor, improving the functionality of the capacitor and therefore the inverter overall.

SUMMARY OF THE DISCLOSURE

The present disclosure provides inverter systems that include a direct-current (DC) voltage supply electrically coupled with a DC link, a plurality of inverters each electrically coupled with the DC link, a plurality of electric machines each electrically coupled with one of the inverters, and a controller coupled with each of the inverters. The controller can control carrier signals of the inverters such that the carrier signals are synchronized and interleaved at an angle (θ) that is determined based on the waveform type of the carrier signals and the number of inverters in the system. In some examples, the carrier signals have a triangular waveform and θ=(180/n)°, where n is the number of inverters. In some examples, the carrier signals have a sawtooth waveform and θ=(360/n)°, where n is the number of inverters.

In some examples, the controller applies a discontinuous pulse width modulation (PWM) to obtain switch control signals for the inverters. In some examples, the controller applies a continuous PWM when modulation index is within a predetermined range. In some examples, the predetermined range is between 0.3 and 0.9, 0.4 and 0.9, or 0.4 and 0.8. In some examples, the controller applies a continuous PWM to obtain switch control signals for the inverters. In some examples, the carrier signals for the plurality of inverters have the same frequency.

Also disclosed herein are methods or processes of generating a plurality of carrier signals for a plurality of inverters. The method includes determining a number of the plurality of inverters and a waveform type for the plurality of carrier signals, calculating an interleaving angle for the plurality of carrier signals based on the number of inverters and the waveform type, and controlling a carrier signal generator to generate the plurality of carrier signals for the plurality of inverters based on the calculated interleaving angle.

In some examples, responsive to determining that the waveform type is a triangular waveform, the interleaving angle (θ) is calculated such that θ=(180/n)°, where n is the determined number of inverters. In some examples, responsive to determining that the waveform type is a sawtooth waveform, the interleaving angle (θ) is calculated such that θ=(360/n)°, where n is the determined number of inverters.

In some examples, the method further includes applying a discontinuous pulse width modulation (PWM) to generate switch control signals for the plurality of inverters. In some examples, the method includes applying a continuous PWM when modulation index is within a predetermined range. The predetermined range is between 0.3 and 0.9, between 0.4 and 0.9, or between 0.4 and 0.8, in some examples.

While multiple embodiments are disclosed, still other embodiments of the present disclosure will become apparent to those skilled in the art from the following detailed description, which shows and describes illustrative embodiments of the present disclosure. Accordingly, the drawings and detailed description are to be regarded as illustrative in nature and not restrictive.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DISCLOSURE

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Figure 4:
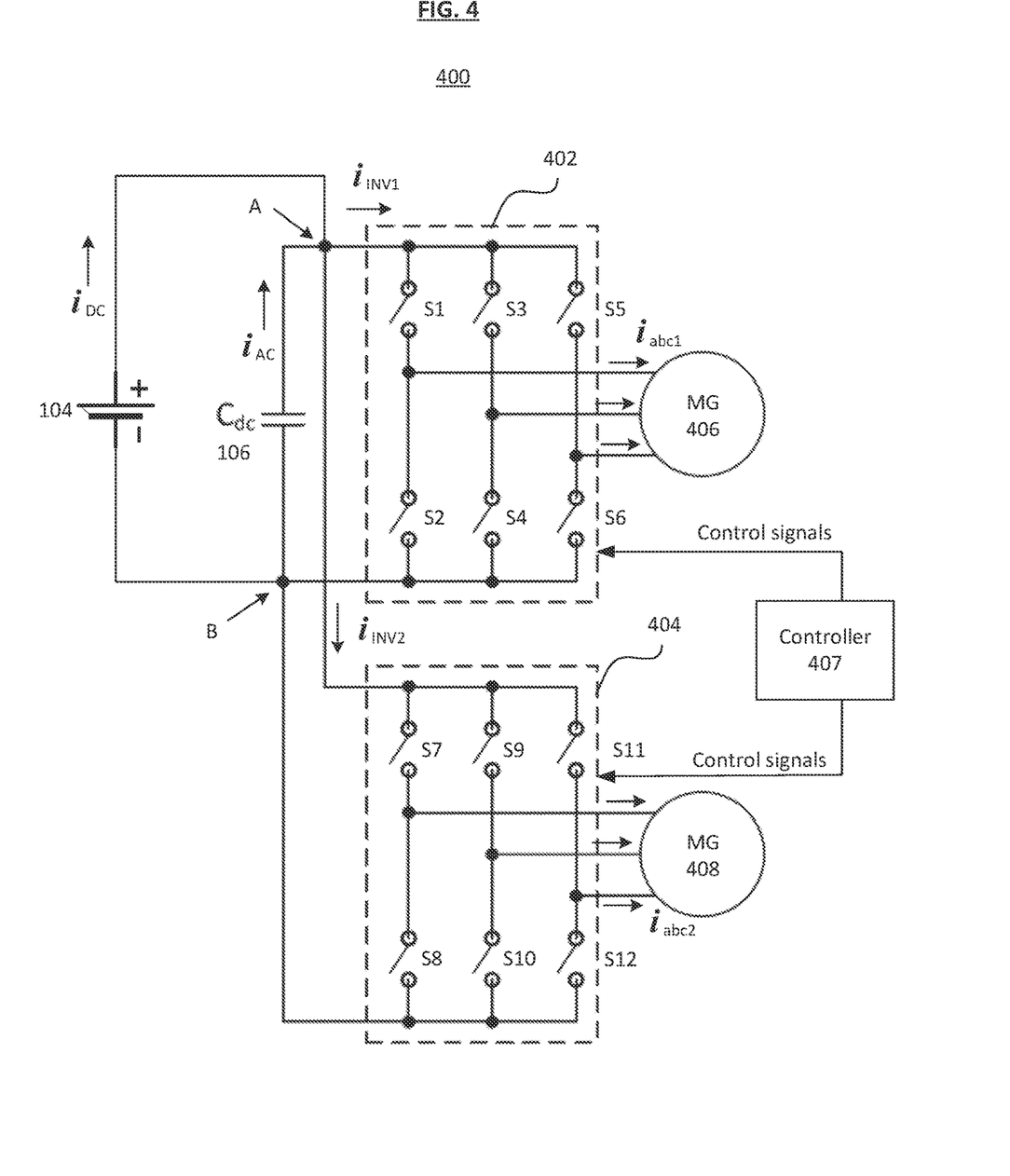
FIG. 4 is a schematic diagram of an inverter system including two inverters, each coupled with a motor-generator and separately controlled via a controller, in accordance with embodiments of the present disclosure.

FIG. 4 shows a schematic diagram of synchronized multi-inverter system 400 with two inverters 402 and 404 coupled with two electric machines such as motor-generators 406 and 408, respectively, where each of the inverters 402 and 404 is parallel to each other with respect to the shared capacitor 106. A controller 407 controls the control signals provided to the switches of the inverters 402 and 404. Each motor-generator has a one-to-one connection with a corresponding inverter. In addition to the switches S1 through S6 included in the first inverter 402, there are switches S7 through S12 included in the second inverter 404. In some examples, more inverters and motor-generators may be implemented in parallel to the inverters 402 and 404 mentioned. Because there are two inverters, the inverter current $i_{INV}$ has two components: $i_{INV1}$ and $i_{INV2}$. The inverter output currents $i_{a1}$, $i_{b1}$, $i_{c1}$ (shown collectively as $i_{abc1}$ in FIG. 4) are the currents passing through the motor-generator 406 when the appropriate switches in switches S1 through S6 are activated. Similarly, the inverter output currents $i_{a2}$, $i_{b2}$, $i_{c2}$ (shown collectively as $i_{abc2}$ in FIG. 4) are the currents passing through the motor-generator 408 when the appropriate switches in switches S7 through S12 are activated. A DC link is configured to electrically couple both the inverters 402 and 404 with the DC voltage source 104, which may be a battery. Nodes A and B are the common nodes of the DC link to which the inverters 402 and 404 are electrically coupled.

Each of the switches S1 through S12 is paired with another switch such that each switch is complementary to the other switch in the same pair. The two switches that share the same node with the motor-generator are paired, for example S1 and S2, S3 and S4, and so on. Any suitable power switch may be employed, as known in the art, including but not limited to metal-oxide-semiconductor field-effect transistors (MOSFET), insulated-gate bipolar transistors (IGBT), thyristors, and diodes, among others. Each pair in the same inverter is controlled via a different reference signal such that each reference signal is separated 120° apart from another reference signal, thus creating the three-phase inverter for the motor-generator. Specifically, each switch is controlled using a control signal from the controller 407 that is generated by comparing a carrier signal and a reference signal using a comparator. A comparator outputs a digital signal such that the output is 1 if voltage of the reference signal is greater than voltage of the carrier signal, and 0 if otherwise. The carrier signal may be a sawtooth or triangular waveform signal as suitable, and the controller or processing unit may use this information to determine the amount of interleaving between the reference signals. As such, the inverter system of 400 is synchronized in that the controller 407 operates to ensure that the inverters 402 and 404 have an identical switching frequency (a.k.a. carrier signal frequency). Other factors of the inverters, such as their output voltages, output currents, and power factors, may vary from each other.

Examples of multi-inverter systems include electric vehicles each having a front machine and a rear machine (requiring two inverters), power-split hybrid vehicles each having a motor and a generator (also requiring two inverters), or vehicles with wheel-hub machines where one inverter is assigned to the operation of each pair of wheels, which may include any suitable number of inverters as determined by the number of wheels.

Figure 5A:
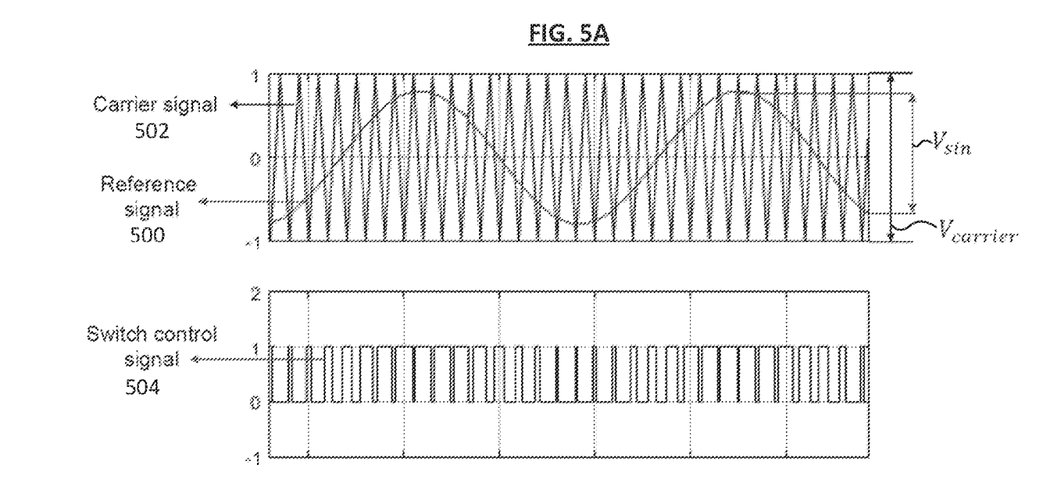
FIG. 5A shows a switch control signal formed by comparing a carrier signal and a reference signal.

FIG. 5A illustrates an example of the reference signal 500 being compared with the carrier signal 502 to generate the switch control signal 504. In this example, the reference signal 500 being used is a continuous sinusoidal signal, and the carrier signal 502 is a triangular waveform signal with a higher frequency than the reference signal 500. The voltage range of the carrier $V_{carrier}$ is greater than the voltage range of the sinusoidal reference signal $V_{sin}$.

Figure 5B:
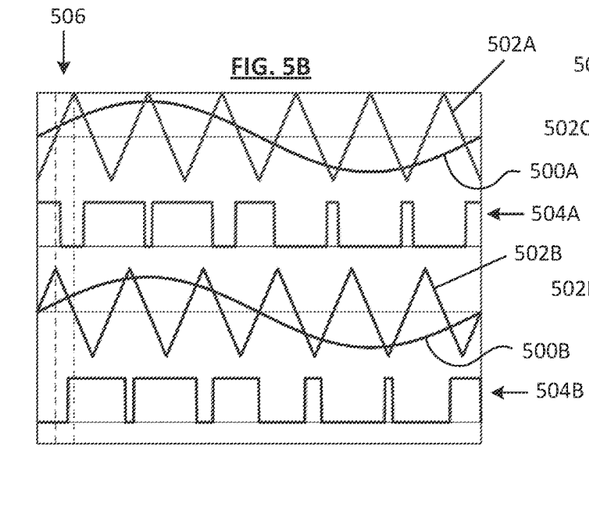
FIG. 5B shows a switch control signal formed using triangular waveform carrier signal.

FIG. 5B shows an example where two switch control signals 504A and 504B are formed as disclosed herein, according to some embodiments. The first switch control signal 504A is generated by comparing the first reference signal 500A to the first carrier signal 502A, and the second switch control signal 504B is generated by comparing the second reference signal 500B to the second carrier signal 502B. Both the first and second carrier signals 502A and 502B are triangular waveform signals, and the second carrier signal 502B has an offset angle 506 (also referred to as phase shifting or interleaving the carrier signals) of 90° (electrical degree) from the first carrier signal 502A. Therefore, when the first carrier signal 502A is at its peak, the second carrier signal 502B is in the midpoint between its peak and nadir.

Figure 5C:
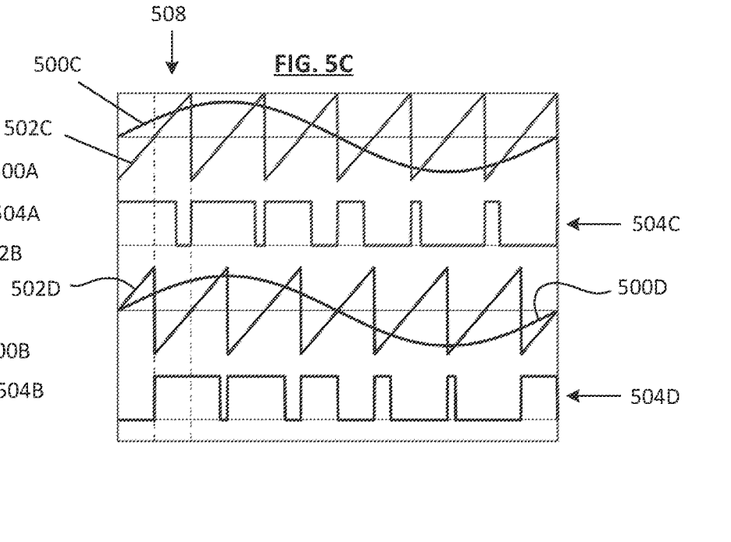
FIG. 5C shows a switch control signal formed using sawtooth waveform carrier signal.

FIG. 5C shows an example where two switch control signals 504C and 504D are formed as disclosed herein, according to some embodiments. The first switch control signal 504C is generated by comparing the first reference signal 500C to the first carrier signal 502C, and the second switch control signal 504D is generated by comparing the second reference signal 500D to the second carrier signal 502D. Both the first and second carrier signals 502C and 502D are sawtooth waveform signals, and the second carrier signal 502D has a 180° offset 508 from the first carrier signal 502C. Therefore, when the first carrier signal 502C is experiencing the drop in voltage, the second carrier signal 502D is in the midpoint between two drops, i.e. halfway up the "ramp" in the sawtooth waveform.

Figure 6:
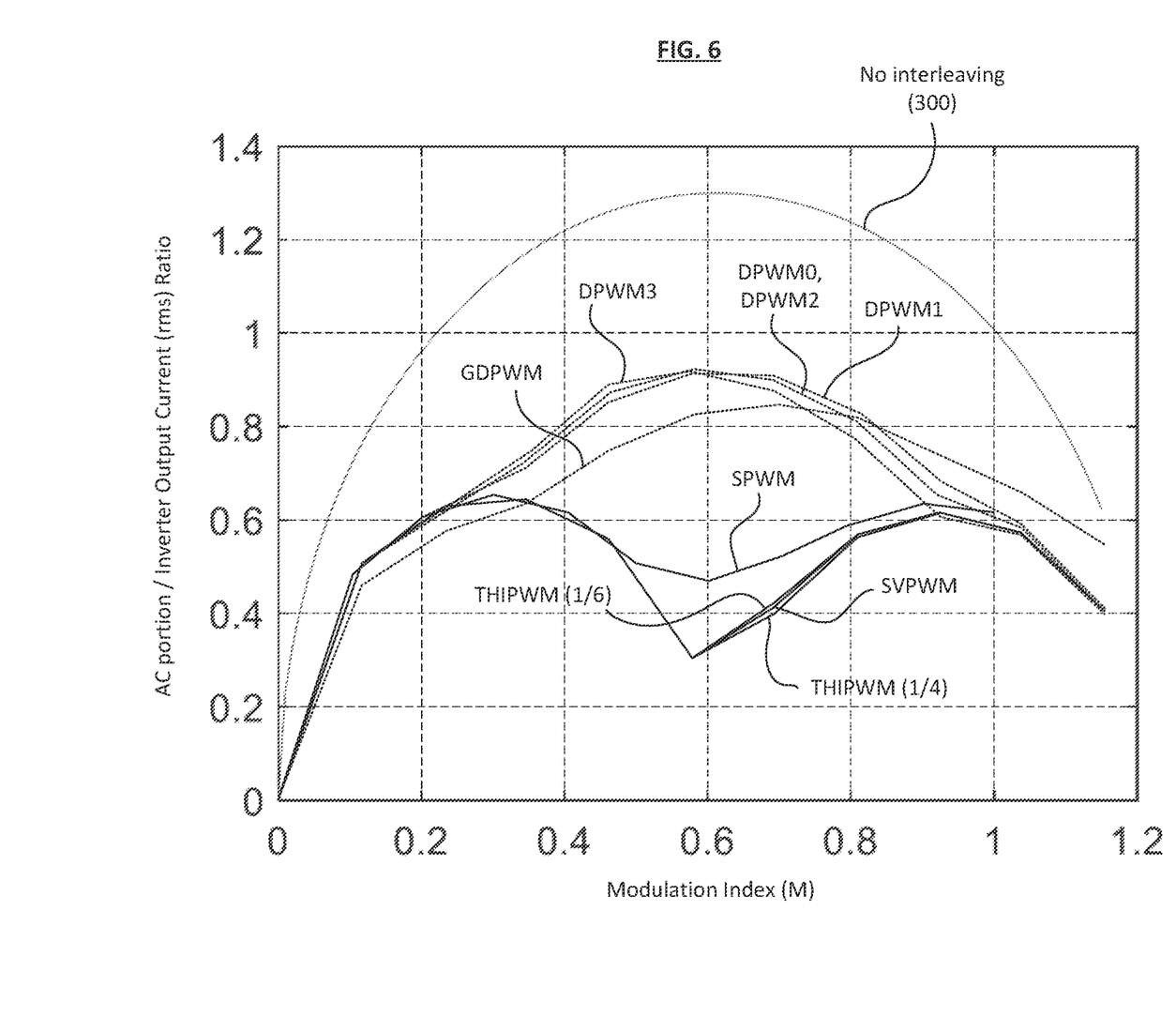
FIG. 6 shows a graph comparing various modulation methods and the effect of carrier signal interleaving on ripple current ratio, in accordance with embodiments of the present disclosure.

FIG. 6 is a graph showing the experimental results of applying the method of interleaving or offsetting carrier signals as explained above (that is, 90° interleaving for a triangular waveform and 180° interleaving for a sawtooth waveform). A normalized DC-link ripple current is calculated by dividing the value of the current from the shared capacitor 106 by the value of the inverter output current. The graph compares the different pulse width modulation (PWM) methods and shows how interleaving the carrier signals affects the ratio of ripple current to inverter output current for a range of modulation indices when power factor is 1. For comparison, the data curve 300 from FIG. 3, where no interleaving is performed on the carrier signal, is inserted into the graph. The value of the data curve 300 is doubled as compared to the values in FIG. 3 due to the presence of two inverters instead of just one. This is because when two inverters operate exactly in the same way and share a common DC link, the current ripple doubles compared to when only one inverter is in the system.

The dotted lines represent the data curves for discontinuous PWM, such as DPWM0, DPWM1, DPWM2, DPWM3, and generalized discontinuous PWM (GDPWM), all of which are performed using modulation waveforms as known in the art. The continuous lines represent the data curves for continuous PWM including sinusoidal PWM (SPWM), third harmonic injection PWM (THIPWM) with an amplitude of either ¼ or ⅙ of the fundamental reference voltage, and space vector PWM (SVPWM), all of which are also performed using modulation waveforms as known in the art described in A. M. Hava, R. J. Kerkman and T. A. Lipo, "A high-performance generalized discontinuous PWM algorithm," in IEEE Transactions on Industry Applications, vol. 34, no. 5, pp. 1059-1071 September-October 1998, doi: 10.1109/28.720446.

As can be observed from FIG. 6, the presence of interleaving carrier signals lower the current ripple ratio (the ratio of ripple current to load current) from 1.3 when there is no interleaving (300) to less than 1 when there is interleaving, or even less, as further explained herein. The ripple current reduction in discontinuous PWMs differs from continuous PWMs in that the continuous PWMs tend to have greater reduction in a range of modulation index of between M=0.4 and M=0.9. For example, focusing on this specific range of modulation indices, it is observed that in this range, the continuous PWMs maintain lower current ripple ratios than the discontinuous PWMs. For example, at the modulation index of M=0.6, when the non-interleaved model experiences the highest ripple current, the SVPWM and both THIPWMs achieve the lowest current ripple ratio of 0.3, thereby achieving approximately 77% reduction in ratio compared to the peak at 1.3 at the same modulation index when no interleaving is applied. Even for SPWM, the ripple current ratio is 0.5 at M=0.6, which is still lower than any of the discontinuous PWMs. The actual ratio values may change depending on the number of inverters that are implemented.

Figure 7A:
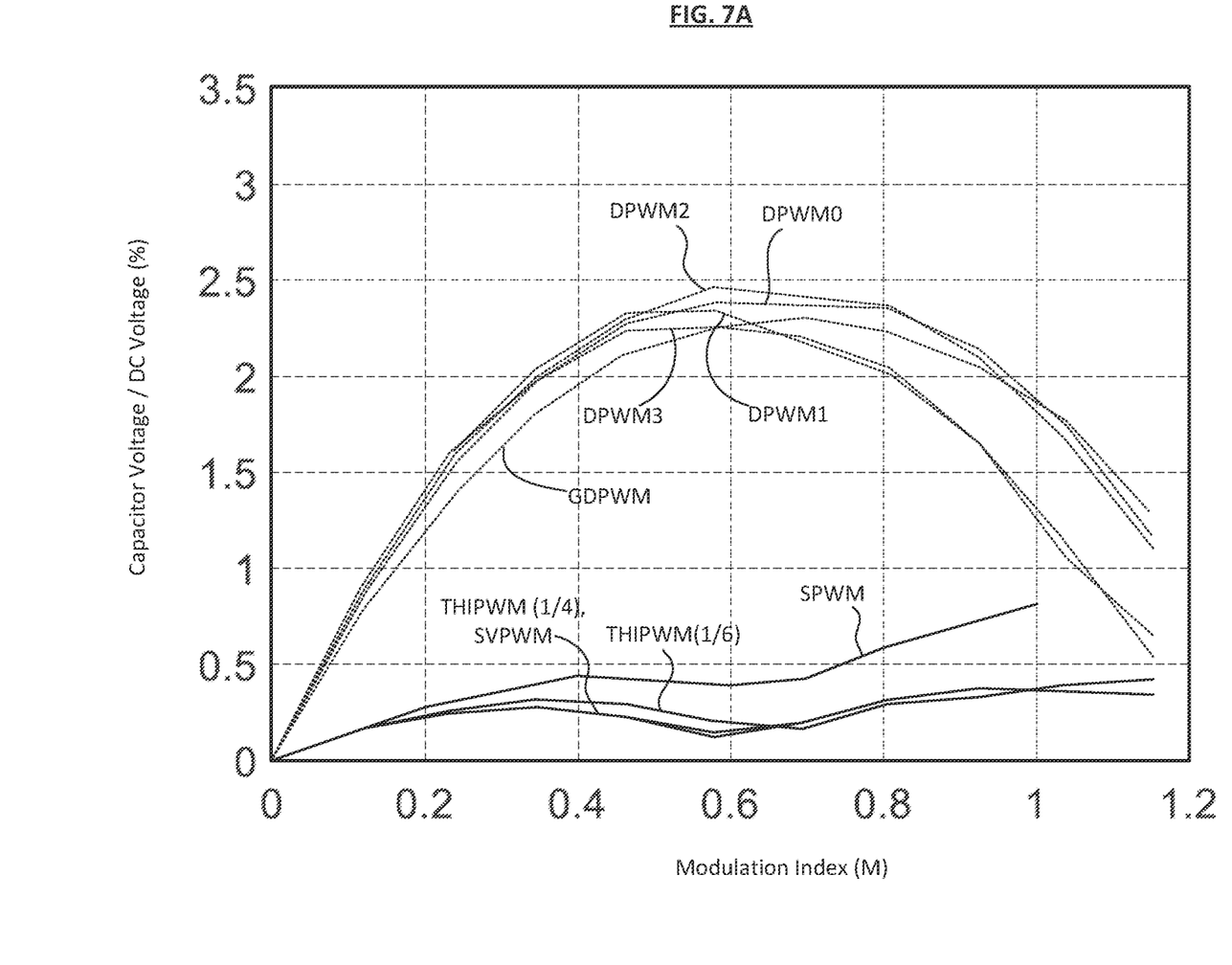
FIG. 7A shows a graph comparing various modulation methods and the effect of a 90° interleaving in triangular waveform carrier signals on the ratio of capacitor peak-to-peak voltage ripple to DC voltage, in accordance with embodiments of the present disclosure.
Figure 7B:
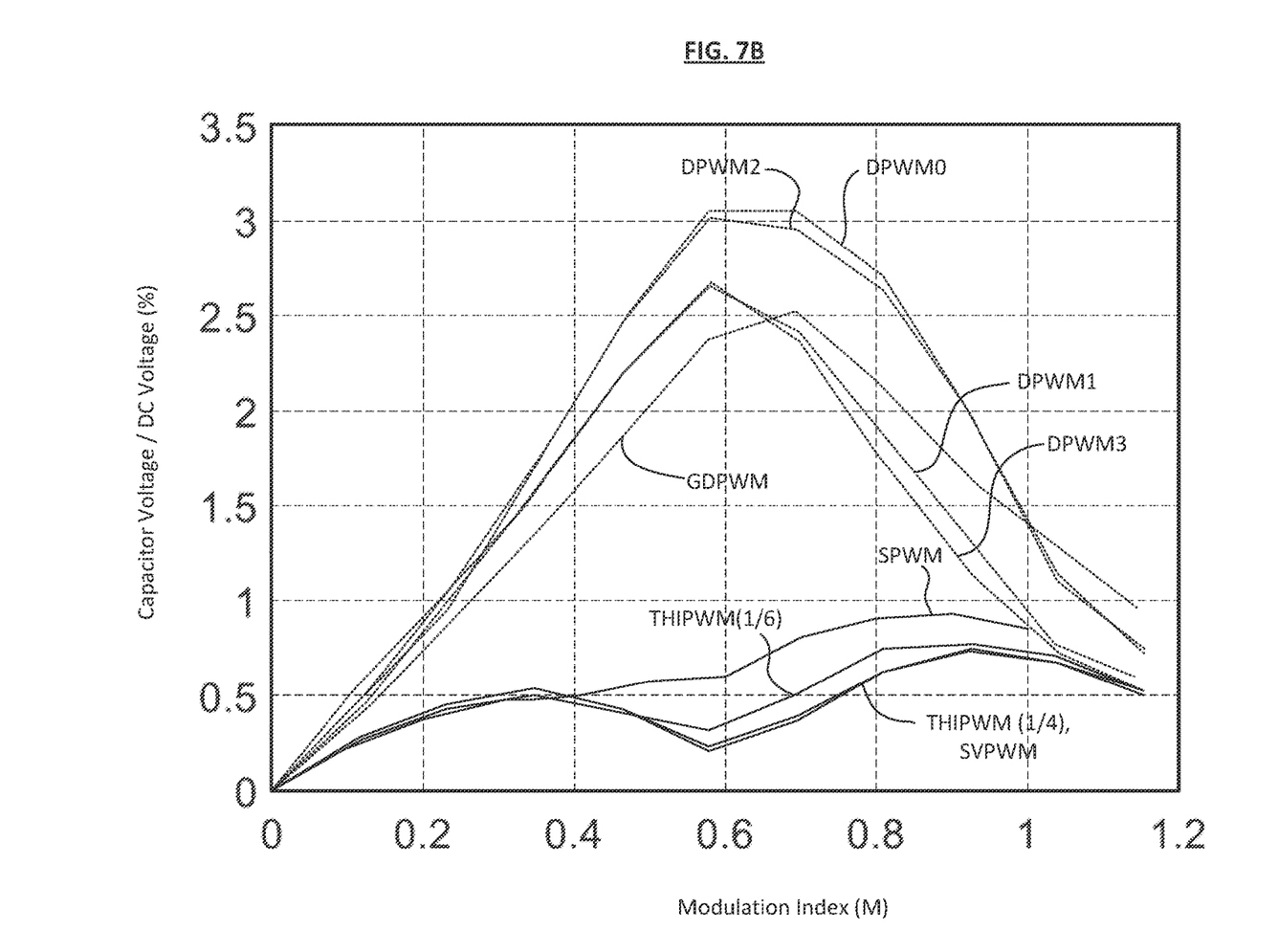
FIG. 7B shows a graph comparing various modulation methods and the effect of a 180° interleaving in sawtooth waveform carrier signals on the ratio of capacitor peak-to-peak voltage ripple to DC voltage, in accordance with embodiments of the present disclosure.

FIGS. 7A and 7B show the voltage ratio curves of the aforementioned types of continuous and discontinuous PWMs, where the voltage ratio is calculated by dividing the capacitor peak-to-peak voltage ripple by the DC voltage assuming a certain DC-link capacitance. The percentage of the capacitor voltage ripple is preferably low to ensure a stable DC-bus voltage. The capacitor voltage ripple is proportional to the integral of the ripple current passing through the capacitor. FIG. 7A shows the voltage ratio curves measured when the 90° interleaving is applied to the triangular waveform carrier signals, and FIG. 7B shows the voltage ratio curves measured when the 180° interleaving is applied to the sawtooth waveform carrier signals.

The interleaving of certain degrees between the two or more carrier signals is shown to be beneficial in reducing the ripple current passing through the capacitor in the inverter system. Although the amount of reduction in the ripple current may vary depending on the type of modulation that is being applied, such as continuous or discontinuous, generally the reduction is the greatest for continuous PWMs within the modulation index range of between M=0.4 and M=0.9. In some examples, the continuous PWMs may be THIPWM or SVPWM.

In some examples, the controller switches between continuous and discontinuous PWMs when the modulation index that is being used is within the range of between M=0.4 and M=0.9. Advantages in switching from a discontinuous PWM to a continuous PWM during a specific range of modulation index include the ability to keep using discontinuous PWM when there is only a small difference in the ratio of ripple current to load current between using discontinuous PWM and continuous PWM. In some examples, using a discontinuous PWM reduces losses during switching, for example in IGBT switches or any other suitable types of switches as known, therefore operate at a higher efficiency than when a continuous PWM is employed. In some examples, the use of a discontinuous PWM allows the switch to operate at a higher frequency before reaching the same internal temperature as when a continuous PWM is used; that is, the switch which uses the discontinuous PWM may operate at a lower internal temperature than the same switch when using the continuous PWM, if the current through the switch remains the same during both PWMs.

FIG. 6 shows the continuous PWMs and most of the discontinuous PWMs (the notable exception being the GDPWM which appears to have lower ratio than the other discontinuous PWMs between M=0.1 and M=0.7 according to the graph) having similar current ratio in the modulation index range of less than M=0.3 or greater than M=0.9. The similar ratios may be defined as the ratios having a difference of less than 10% or 5% from each other, for example. Therefore, the controller may switch from discontinuous PWM to continuous PWM in certain predetermined ranges as theoretically determined or experimentally measured. In some examples, the predetermined ranges may be any one of the following ranges: from M=0.3 to M=0.9, from M=0.4 to M=0.9, and from M=0.4 to M=0.8.

Although the synchronized inverter system 400 is shown with two inverters, there may be any additional number of inverters that are implemented parallel to the two inverters, as previously explained. When the number of inverters increases, the offset or interleaving angle 506 or 508 shown in FIGS. 5B and 5C that achieves low ripple current also changes according to the following formulas:

For triangular waveform carrier signals, Interleaving Angle $(\Theta) = \left(\frac{180}{n}\right)°$ For sawtooth waveform carrier signals, Interleaving Angle $(\Theta) = \left(\frac{360}{n}\right)°$ where n=the number of inverters in the system that share the common DC link and therefore are parallel to each other. As such, when there are three inverters, the interleaving angle (θ) is 60° for the triangular waveform and 120° for the sawtooth waveform, and when there are four inverters, the interleaving angle (θ) is 45° for the triangular waveform and 90° for the sawtooth waveform, etc. These inverters, regardless of the number of inverters, can have different current, voltage, power factor, and functions (that is, whether the motor-generator that is coupled with the inverter is being used as a motor or generator), so long as the carrier signal frequency remains the same amongst all the inverters.

Figure 8:
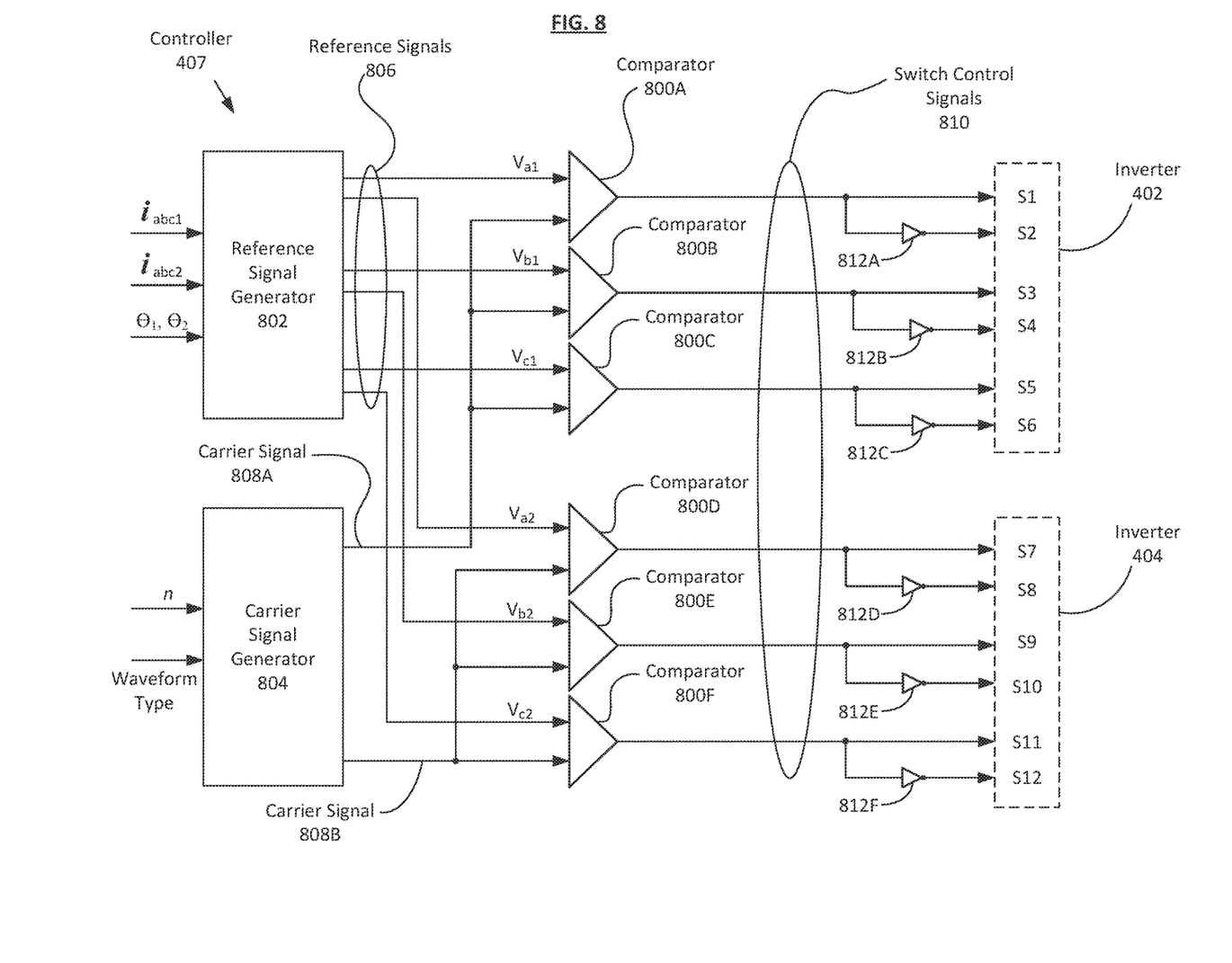
FIG. 8 shows an exemplary controller operable to generate the switch control signals for the different sets of inverter switches, in accordance with embodiments of the present disclosure.

FIG. 8 is a high-level block diagram of an exemplary controller 407 as illustrated in FIG. 4. The activation of the switches S1 through S12 of the inverters 402 and 404 is regulated using PWM control implemented by the controller 407. The controller 407 has a switching regulator that generates switch control signals 504 that can be used to turn switches S1 through S12 on and off. Specifically, the switching regulator includes a plurality of comparators 800, a reference signal generator 802, and a carrier signal generator 804.

The carrier signal generator 804 receives or detects the number of inverters (n) that are implemented in the multi-inverter system 400. In the example shown, there are two inverters 402 and 404 sharing the common DC link, so the carrier signal generator 804 calculates the interleaving angle (θ) using the formulas as explained herein, where the angle is dependent upon the waveform type (that is, sawtooth or triangular) of the carrier signal, which is also detected or received. Any suitable method of detection of the number of inverters and the waveform type may be implemented, for example via sensors.

In the example shown, the reference signal generator 802, which may be any suitable signal generating device, receives or detects the inverter output currents $i_{abc1}$ and $i_{abc2}$ as previous discussed, as well as motor position angles $\theta_1$ and $\theta_2$ of the motor being driven by inverters 402 and 404, respectively. Based on these inputs, the reference signal generator 802 generates a reference signal 806 for each pair of switches in the inverters. The exemplary system 400 includes two inverters with three pairs of switches, therefore there are a total of six comparators 800A through 800F, each receiving corresponding one of the reference signals $V_{a1}$, $V_{b1}$, $V_{c1}$, $V_{a2}$, $V_{b2}$, and $V_{c2}$, as input.

At the same time as the reference signals 806 are generated by the reference signal generator 802, the carrier signal generator 804 generates two carrier signals 808A and 808B, where the two signals differ from each other by the interleaving angle θ as calculated based on the inputted number of inverters and the type of waveform signal being implemented. The first carrier signal 808A is inputted into the comparators 800A, 800B, and 800C of the first inverter 402, and the second carrier signal 808B is inputted into the comparators 800D, 800E, and 800F of the second inverter 404.

Each of the comparators 800 subsequently compares the inputted reference signal 806 with the inputted carrier signal 808 and outputs switch control signals 810 for each pair of switches, such that one switch of the pair receives the switch control signal 810 as is and the other switch of the pair receives the inverted signal after the switch control signal 810 passes through a corresponding inverter logic gate 812, as shown. As the number of inverters increases, the number of comparators 800, the number of different reference signals generated by the reference signal generator 802, and the number of different carrier signals generated by the carrier signal generator 804 may also increase accordingly. It is to be understood that FIG. 8 is shown as an illustrative example only, and some examples or embodiments of the controller may include additional components as suitable to facilitate synchronized controlling of the inverters with respect to the determined interleaving angle.

Figure 9:
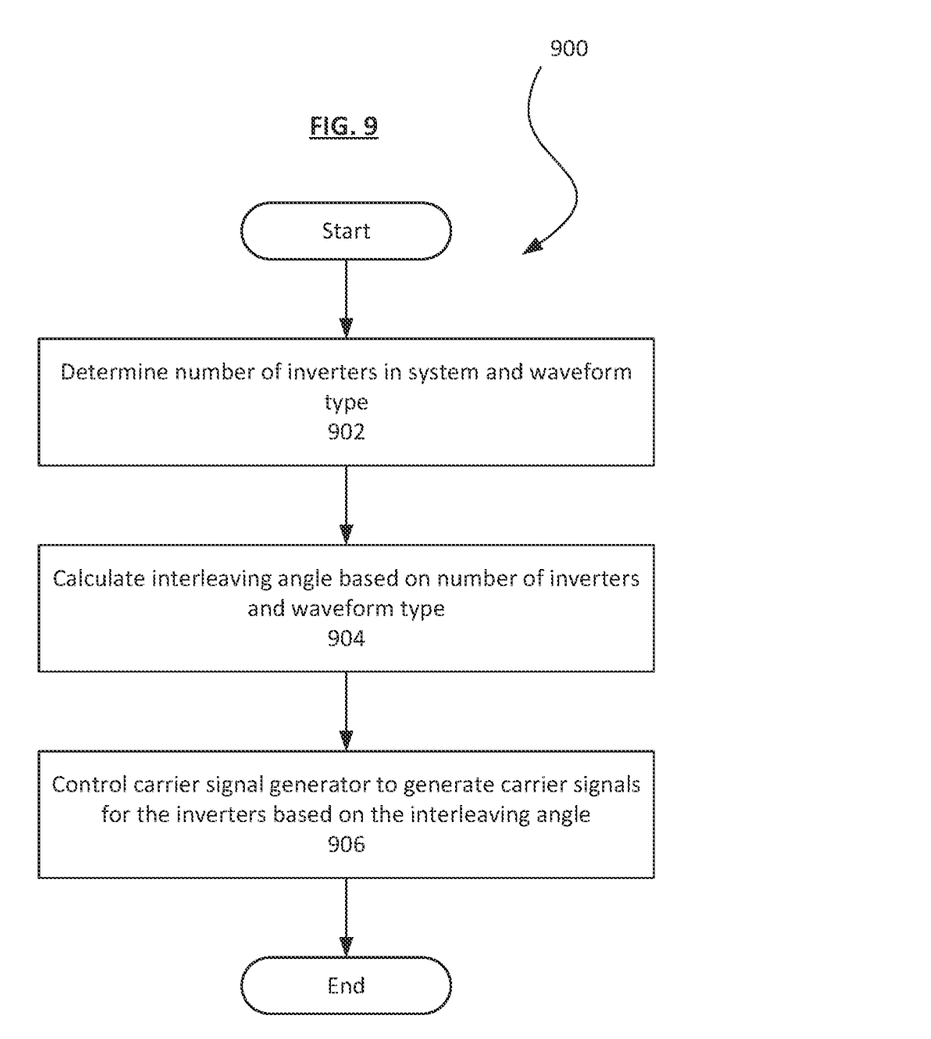
FIG. 9 shows an exemplary method as implemented by the controller to generate the switch control signals for the inverter switches, in accordance with embodiments of the present disclosure.

FIG. 9 illustrates an exemplary process 900 as implemented by the controller 407 to generate the switch control signals 810 as shown in FIG. 8. In step 902, the controller determines the number of inverters that are being operated in the system as well as the type of waveform of the carrier signal that is to be generated. In step 904, the controller calculates the interleaving angle based on the number of inverters and the type of waveform as determined in step 902. For example, when the waveform type is a triangular waveform, the interleaving angle θ is calculated such that θ=(180/n)°, where n is the determined number of inverters; alternatively, when the waveform type is a sawtooth waveform, the interleaving angle θ is calculated such that θ=(360/n) °. Then, in step 906, the controller controls the carrier signal generator to generate interleaved carrier signals for the determined number of inverters based on the determined interleaving angle. Therefore, each of the interleaved carrier signals are offset by the interleaving angle before being input into the comparator as disclosed herein.

In some examples, the process 900 also includes applying a discontinuous PWM to generate the switch control signals for the plurality of inverters, and in some cases applying a continuous PWM when modulation index is within a predetermined range. The predetermined range of modulation index may be between 0.3 and 0.9, between 0.4 and 0.9, or between 0.4 and 0.8, for example, as explained herein.

The disclosure pertains to any system with a plurality of inverters, where each inverter is coupled with the common DC link (and therefore, a common DC voltage source) to convert the DC voltage from the DC link to AC voltage for a motor-generator (which may be a motor, a generator, or both). In some examples, each inverter is coupled to one and only one motor-generator, and the motor-generators operate independently of each other but are synchronized by a common controller that operates to adjust the carrier signals of the inverters. The synchronized inverter system may be employed in vehicles such as electric or hybrid vehicles, power generators such as backup electric generators for emergency power systems, and any other electrical application which involves two or more motor-generators. Additionally, the controller may include any suitable electronic device such as a microcontroller, processing unit, or computing device, among others, that is capable of synchronizing the inverters using switch control signals produced as explained above.

It is to be understood that the above description is intended to be illustrative, and not restrictive. Many other embodiments will be apparent to those of skill in the art upon reading and understanding the above description. For example, it is contemplated that features described in association with one embodiment are optionally employed in addition or as an alternative to features described in association with another embodiment. The scope of the present disclosure should, therefore, be determined with reference to the appended claims, along with the full scope of equivalents to which such claims are entitled.

What is claimed is:

1. An inverter system comprising:
a direct-current (DC) voltage supply electrically coupled with a DC link;
a plurality of inverters, each electrically coupled with the DC link;
a plurality of electric machines, each electrically coupled with a corresponding one of the inverters; and
a controller coupled with each of the inverters and operative to control carrier signals of the inverters such that the carrier signals are synchronized and interleaved at an angle ($\theta$) that is determined based on a waveform type of the carrier signals and a number of the plurality of inverters.

2. The inverter system of claim 1, wherein the carrier signals have a triangular waveform and $\theta=(180/n)°$, where n is the number of inverters.

3. The inverter system of claim 1, wherein the carrier signals have a sawtooth waveform and $\theta=(360/n)°$, where n is the number of inverters.

4. The inverter system of claim 1, wherein the controller is configured to apply a discontinuous pulse width modulation (PWM) to obtain switch control signals for the inverters.

5. The inverter system of claim 4, wherein the controller is configured to apply a continuous PWM when modulation index is within a predetermined range.

6. The inverter system of claim 5, wherein the predetermined range is between 0.3 and 0.9, between 0.4 and 0.9, or between 0.4 and 0.8.

7. The inverter system of claim 1, wherein the controller is configured to apply a continuous PWM to obtain switch control signals for the inverters.

8. The inverter system of claim 1, wherein the carrier signals for the plurality of inverters have the same frequency.

9. A method of generating a plurality of carrier signals for a plurality of inverters, comprising:
determining a number of the plurality of inverters and a waveform type for the plurality of carrier signals;
calculating an interleaving angle for the plurality of carrier signals based on the number of inverters and the waveform type; and
controlling a carrier signal generator to generate the plurality of carrier signals for the plurality of inverters based on the calculated interleaving angle.

10. The method of claim 9, wherein responsive to determining that the waveform type is a triangular waveform, the interleaving angle ($\theta$) is calculated such that $\theta=(180/n)°$, where n is the determined number of inverters.

11. The method of claim 9, wherein responsive to determining that the waveform type is a sawtooth waveform, the interleaving angle ($\theta$) is calculated such that $\theta=(360/n)°$, where n is the determined number of inverters.

12. The method of claim 9, further comprising: applying a discontinuous pulse width modulation (PWM) to generate switch control signals for the plurality of inverters.

13. The method of claim 12, further comprising: applying a continuous PWM when modulation index is within a predetermined range.

14. The method of claim 13, wherein the predetermined range is between 0.3 and 0.9, between 0.4 and 0.9, or between 0.4 and 0.8.

15. An inverter system comprising:
a direct-current (DC) voltage supply electrically coupled with a DC link;
a plurality of inverters, each electrically coupled with the DC link;
a plurality of electric machines, each electrically coupled with a corresponding one of the inverters; and
a controller coupled with each of the inverters and operative to control carrier signals of the inverters,
wherein the controller controls the carrier signals to be synchronized and interleaved at an angle ($\theta$) that is determined based on a combination of both a waveform type of the carrier signals and a number of the plurality of inverters, wherein the waveform type is selected from: a triangular waveform or a sawtooth waveform.

16. The inverter system of claim 15, wherein the number of the plurality of inverters is at least three.

17. The inverter system of claim 15, wherein the controller is configured to apply a discontinuous pulse width modulation (PWM) to obtain switch control signals for the inverters.

18. The inverter system of claim 17, wherein the controller is configured to apply a continuous PWM when modulation index is within a predetermined range.

19. The inverter system of claim 18, wherein the predetermined range is between 0.3 and 0.9, between 0.4 and 0.9, or between 0.4 and 0.8.

20. The inverter system of claim 15, wherein the controller is configured to apply a continuous PWM to obtain switch control signals for the inverters.

* * * * *